(12) United States Patent
Benner

(10) Patent No.: US 7,705,289 B2
(45) Date of Patent: Apr. 27, 2010

(54) SCANNING UNIT FOR AN OPTICAL POSITION-MEASURING DEVICE

(75) Inventor: Ulrich Benner, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 12/142,567

(22) Filed: Jun. 19, 2008

(65) Prior Publication Data

US 2008/0315077 A1    Dec. 25, 2008

(30) Foreign Application Priority Data

Jun. 22, 2007    (DE) .................... 10 2007 028 943

(51) Int. Cl.
*G01D 5/34* (2006.01)
(52) U.S. Cl. .............................. 250/231.13; 250/231.14
(58) Field of Classification Search ............ 250/231.13, 250/231.14–231.18
See application file for complete search history.

(56) References Cited

U.S. PATENT DOCUMENTS

| | | | | |
|---|---|---|---|---|
| 5,534,693 A | * | 7/1996 | Kondo et al. ............ 250/237 G |
| 6,528,779 B1 | * | 3/2003 | Franz et al. ............... 250/214.1 |
| 6,654,128 B2 | * | 11/2003 | Takayama et al. ........... 356/499 |
| 7,193,204 B2 | | 3/2007 | Mitchell |
| 2004/0004181 A1 | * | 1/2004 | Ohmura et al. ......... 250/231.13 |
| 2004/0206894 A1 | * | 10/2004 | Oka et al. ............... 250/231.13 |
| 2007/0262250 A1 | | 11/2007 | Benner |

FOREIGN PATENT DOCUMENTS

DE    10 2006 021 017    11/2007
JP    11-243258    9/1999

* cited by examiner

*Primary Examiner*—Georgia Y Epps
*Assistant Examiner*—Kevin Wyatt
(74) *Attorney, Agent, or Firm*—Kenyon & Kenyon LLP

(57) ABSTRACT

A scanning unit for an optical position-measuring device includes a semiconductor light source and at least one downstream reflector element that has a defined optical effect on the beams of rays emitted by the semiconductor light source. The optically active surface of the reflector element is arranged in subregions to be reflection-preventive such that no beams of rays are reflected back from the reflector element into the semiconductor light source.

16 Claims, 4 Drawing Sheets

SCANNING UNIT FOR AN OPTICAL POSITION-MEASURING DEVICE

CROSS-REFERENCE TO RELATED APPLICATIONS

The present application claims priority to Application No. 10 2007 028 943.1, filed in the Federal Republic of Germany on Jun. 22, 2007, which is expressly incorporated herein in its entirety by reference thereto.

FIELD OF THE INVENTION

The present invention relates to a scanning unit for an optical position-measuring device.

BACKGROUND INFORMATION

German Published Patent Application No. 10 2006 021 017 describes an optical position-measuring device having a scanning unit. In the scanning unit, a reflector element is arranged in front of a light source in the scanning beam path. The positioning and arrangement of the reflector element provides that the light source is positioned virtually in the plane of detection, which is an important prerequisite in the utilized scanning principle.

The light source used in this position-measuring device is preferably a point light source, which may be configured, for example, as a semiconductor light source in the form of a so-called VCSEL (vertical cavity surface emitting laser). A problem in such light sources is the possibility of radiation being reflected back from the scanning beam path into the light source. Such back-reflections change the mode spectrum of the semiconductor light source.

Furthermore, interference effects by repeatedly reflected beams of rays in the scanning beam path may be produced as a result of such back-reflections. These also entail collapses in the angular spectrum of the light source. In addition, such back-reflections may have the consequence that the correct positioning of the virtual light source in the scanning beam path is no longer ensured. This affects the tolerance behavior of the position-measuring device negatively.

In Japanese Published Patent Application No. 11-243258 and U.S. Pat. No. 7,193,204, this problem in the use of semiconductor light sources in optical position-measuring devices is recognized. Various design approaches have been provided to circumvent the back-reflection problem.

For example, U.S. Pat. No. 7,193,204 provides for the scanning unit to be tilted slightly with respect to the scanned measuring graduation in order to prevent back-reflections or at least to minimize them.

To avoid these disadvantages, Japanese Published Patent Application No. 11-243258 provides for a lambda quarter disk to be arranged in the scanning beam path, which prevents light from being reflected at a polarization-altering orientation back into the semiconductor light source. These design approaches, however, are on the one hand relatively costly, while on the other hand they intervene in the actually ideal scanning beam path such that one must pay the price of a deterioration of the optimal optical conditions in relation to the scanning process. This is true particularly if a tilting between the scanning unit and the measuring graduation is provided, for example.

SUMMARY

Example embodiments of the present invention prevent back-reflection of radiation into a semiconductor light source used in a scanning unit of an optical position-measuring device, particularly if a reflector element is arranged in the scanning beam path of the scanning unit.

Example embodiments of the present invention provide for the optically active surface of subregions of the reflector element in the scanning unit to be arranged in a reflection-preventive manner such that no beams of rays are reflected back from the reflector element into the semiconductor light source. In this manner, it is possible to eliminate or at least markedly minimize the otherwise resulting reflections from the reflector element into the semiconductor light source and the associated problems.

The reflector element may have a curved surface facing the semiconductor light source. The reflector element is furthermore arranged to prevent reflections in a central subregion and to cause reflections in the remaining sections for the beams of rays emitted by the semiconductor light source.

The scanning unit may include a transparent carrier substrate, on the first side of which the light-emitting area of the semiconductor light source is arranged and on the opposite second side of which the reflector element is arranged, the optically active surface of which is oriented in the direction of the semiconductor light source.

The reflector element takes the form, for example, of an optical component integrated into the second side of the carrier substrate.

For this purpose, the second side of the carrier substrate may be arranged in regions directly adjacent to the reflector element so as to prevent reflections of the beams of rays emitted by the semiconductor light source.

Furthermore, it is possible to apply a reflection-preventing coating in the reflection-preventing subregion of the reflector element.

For this purpose, the reflection-preventing coating may take the form of an interferential anti-reflection coating and/or absorption coating.

Furthermore, a reflection-preventing subregion may be formed on the first side of the carrier substrate around the light-emitting area of the semiconductor light source. This additional measure allows for a further improvement in the prevention of the interference effects mentioned above by repeatedly reflected beams of rays in the scanning beam path.

For this purpose, the light source-side reflection-preventing subregion has at least the size of the area illuminated by the semiconductor light source on the carrier substrate.

The reflection-preventing subregion takes the form of a reflection-preventing coating on the carrier substrate, for example.

Furthermore, with the exception of the light-emitting area, the side of the semiconductor light source facing the reflector element may be arranged so as to prevent reflections.

Additionally, electrically conductive conductor tracks for contacting the semiconductor light source may be arranged on the first side of the carrier substrate.

The semiconductor light source may take the form of a VCSEL.

The scanning unit is used, for example, in a position-measuring device having a measuring graduation, the scanning unit being situated so as to allow movement relative to the measuring graduation.

It is furthermore possible to provide both rotary as well as linear optical position-measuring devices with corresponding scanning units.

In addition to optical position-measuring devices operated in incident-light, systems operated in transmitted light may also have scanning units according to example embodiments of the present invention.

Further features and aspects of example embodiments of the present invention are explained in more detail below with reference to the appended Figures.

BRIEF DESCRIPTION OF THE DRAWINGS

FIG. 1b is a top view of the scanning unit of the position-measuring device illustrated in FIG. 1a.

FIG. 2b is a top view of the reflector element illustrated in FIG. 2a.

DETAILED DESCRIPTION

Figure 1A:
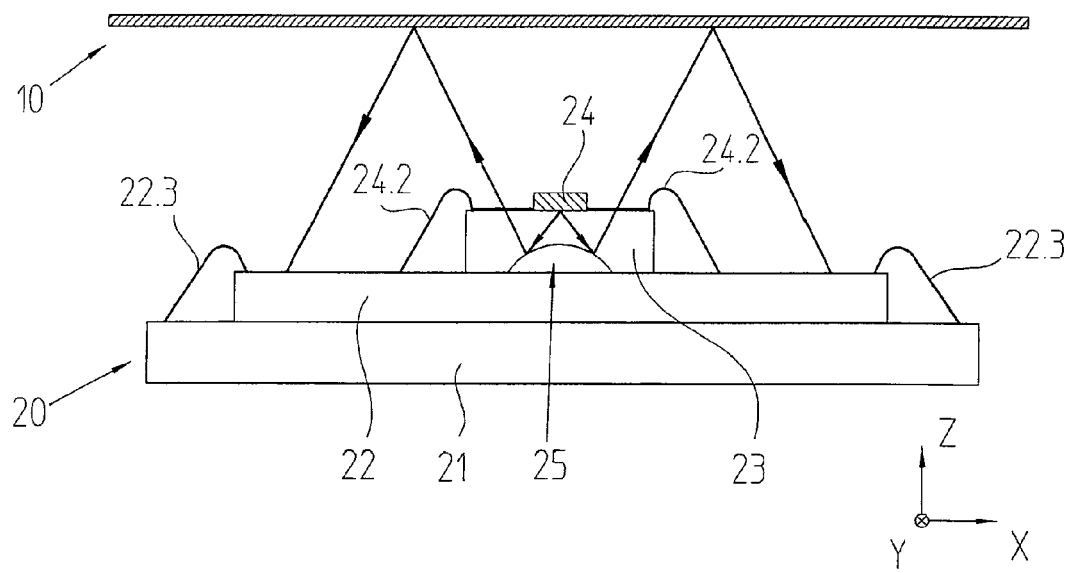
FIG. 1a schematically illustrates an optical position-measuring device with a scanning unit according to an example embodiment of the present invention.
Figure 1B:
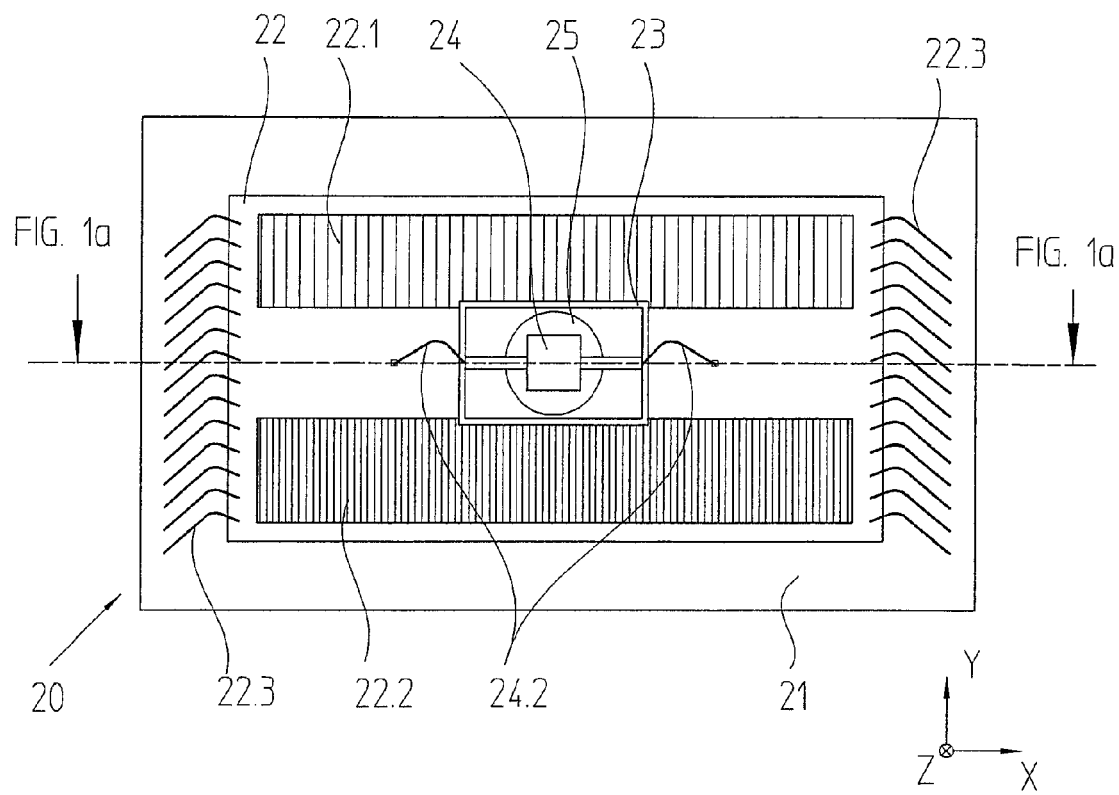

An optical position-measuring device having a scanning unit according to an example embodiment of the present invention is explained below with reference to FIGS. 1a and 1b. FIG. 1a is a schematic side view of parts of scanning unit 20 and of reflection measuring graduation 10 including the scanning beam path, while FIG. 1b is a top view of scanning unit 20 illustrated in FIG. 1a.

In the example illustrated, the optical position-measuring device includes a scanning unit 20 which is arranged in a manner allowing movement relative to a reflection measuring graduation 10 in measuring direction x. For example, reflection measuring graduation 10 and scanning unit 20 are connected to two objects displaceably disposed relative to each other in measuring direction x, for instance, two machine parts movable relative to each other. A downstream control unit is able to control the movement of these machine parts, e.g., in a conventional manner, via the position-dependent output signals of the optical position-measuring device.

In the example illustrated, reflection measuring graduation 10 has a track having a linear incremental graduation as well as a track parallel thereto, having a pseudo-random coding for the absolute-position detection. Both tracks are arranged on a suitable graduated scale carrier, for example, a steel substrate.

The track having the incremental graduation includes subregions disposed periodically in measuring direction x and having different optical reflective properties. The subregions extend in the graduation plane perpendicular to measuring direction x, i.e., in the indicated y-direction. The subregions of the example embodiment shown have different phase-shifting effects on the beams of rays reflected by them. In this example, reflection measuring graduation 10 takes the form of a reflection phase grating.

The track having the pseudo-random coding includes subregions disposed aperiodically in the measuring direction x and having different optical reflective properties.

Only one part of scanning unit 20 is discernible in the highly schematic illustrations provided in FIGS. 1a and 1b. Scanning unit 20 may also include a suitable housing in which its various components are provided. For reasons of clarity, only the components necessary for explanation are illustrated in the figures.

On the side of scanning unit 20, a detector unit 22 having two detector configurations 22.1, 22.2 is provided on a support board 21 in the present example. A first detector configuration 22.1 is used for scanning a periodic fringe pattern in the detection plane and for generating a plurality of phase-shifted incremental signals. The scanned fringe pattern results from the optical scanning of the incremental graduation on reflection measuring graduation 10. In this case, first detector configuration 22.1 may include, e.g., a conventional, detector array, having a periodic arrangement of individual detector elements or photodiodes in measuring direction x. A second detector configuration 22.2 acts, e.g., in a conventional manner, for scanning the pseudo-random coding of the second track projected into the detection plane. The generation of at least one absolute-position signal is possible via second detector configuration 22.2. For simplicity, the incremental signals and absolute-position signals generated in this manner are denoted hereinafter only as position signals.

In the present variant of the scanning unit, both detector configurations 22.1, 22.2 are electrically contacted, i.e., electroconductively connected via bonding wires 22.3 to conductor tracks in support board 21. The generated position signals are supplied via the conductor tracks in support board 21 to a downstream control unit for further processing.

Above detector unit 22 having the two detector configurations 22.1, 22.2, a transparent carrier substrate 23, for example, in the form of a plate-shaped glass carrier substrate, is arranged on the side of scanning unit 20 in a central subregion of the detector configurations. In the present example, this carrier substrate takes up only a smaller part of the total area of the detector configuration(s) or the surface of detector unit 22, as is apparent, for instance, from FIG. 1b. On the upper side of carrier substrate 23, hereinafter denoted as first side of carrier substrate 23, a semiconductor light source 24 is provided. For this purpose, a so-called VCSEL (vertical cavity surface emitting laser) is chosen as a suitable semiconductor light source 24. Semiconductor light source 24 is electrically contacted via further bonding wires 24.2, which are connected on the upper side of carrier substrate 23 to corresponding contacts. These contacts are connected to conductor tracks in detector unit 22 via bonding wires 24.2.

Light-emitting area 24.1 of semiconductor light source 24 is oriented in the direction of the upper side or first side of carrier substrate 23. Consequently, semiconductor light source 24 radiates away from reflection measuring graduation 10 in the direction of the lower side or second side of carrier substrate 23.

On the lower side or second side of carrier substrate 23, a reflector element 25 is arranged, which has a defined optical effect on the beams of rays in the scanning beam path emitted by semiconductor light source 24. Additional details regarding the arrangement of reflector element 25 are provided below in connection with the description of FIG. 2.

As indicated in FIG. 1a, the beams of rays coming from semiconductor light source 24 are deflected or reflected back by reflector element 25 in the direction of reflection measuring graduation 10, and subsequently pass through carrier substrate 23 again in the reverse direction. The beams of rays arrive on reflection measuring graduation 10, and there, in turn, are reflected back in the direction of scanning unit 20. On the side of scanning unit 20, the beams of rays coming from reflection measuring graduation 10 ultimately arrive on detector configurations 22.1, 22.2 placed in the detection plane, and there, in the event of the relative movement of scanning unit 20 and reflection measuring graduation 10, generate displacement-dependent position signals. In the case of the incremental signals, a periodic fringe pattern is generated in the detection plane via the described scanning beam path and the resulting interactions of the beams of rays with reflection measuring graduation 10. In the case of the relative movement of scanning unit 20 and reflection measuring graduation 10, this fringe pattern is modulated as a function of the displacement and is converted, e.g., in a conventional manner, via detector configuration 22.1 into a plurality of phase-shifted incremental signals for further processing.

Due to the provided scanning principle, in this position-measuring device, it is decisive for producing the incremental signals that semiconductor light source 24 is arranged, e.g., in the detection plane. Only in this case is it possible to ensure the insensitivity of the generated periodic fringe pattern in the detection plane with respect to changes in the scanning distance. According to conventional systems, either one accepts such a fluctuation of the stripe-pattern period in the detection plane, or else a central positioning of the light source in a cavity is provided, which is surrounded by the detector configuration. In the present optical position-measuring device, an alternative advantageous possibility for solving this problem is provided by a particular layout of the scanning beam path, and especially by the provision of aforementioned reflector element 25. Thus, by integrating suitably dimensioned reflector element 25 into the scanning beam path, it is possible to place light source 24 virtually in the detection plane, while it is in fact or in reality arranged at another position in scanning unit 20. As may be seen from FIGS. 1a and 1b, for example, semiconductor light source 24 is disposed on the first side or upper side of carrier substrate 23. Regarding further details of the scanning principle of this optical position-measuring device, reference is made to German Published Patent Application No. 10 2006 021 017 and U.S. Patent Application Publication No. 2007/0262250, each of which is expressly incorporated herein in its entirety by reference thereto.

In order to prevent, in a scanning principle of this type, beams of rays from being reflected by reflector element 25 back into semiconductor light source 24 and impairing the measuring accuracy, scanning unit 20 provides for the surface of reflector element 25 that is optically active in the scanning beam path to be arranged in subregions in a reflection-preventing manner such that no beams of rays are reflected by reflector elements 25 back into semiconductor light source 24.

Figure 2A:
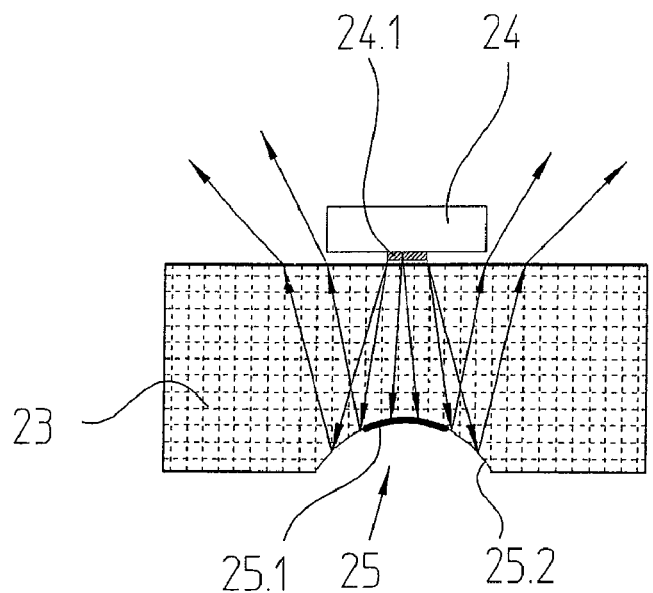
FIG. 2a is a partial view of the scanning unit illustrated in FIGS. 1a and 1b including parts of the scanning beam path.
Figure 2B:
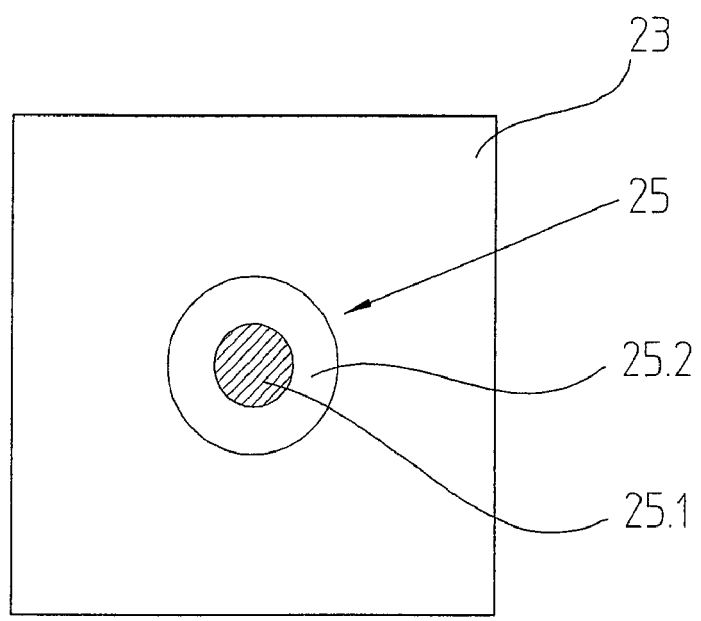

These measures are explained in more detail with reference to FIGS. 2a and 2b, FIG. 2a showing a partial representation of the scanning unit illustrated in FIGS. 1a and 1b including a part of the scanning beam path and FIG. 2b showing a top view of the reflector element.

As illustrated in FIG. 2a, reflector element 25 is provided as an optical component integrated into the second side of carrier substrate 23. It has a curved surface facing semiconductor light source 24. On the side of reflector element 25 facing semiconductor light source 24, which functions as the optically active surface in the scanning beam path, a central subregion 25.1 is arranged to prevent reflections. From this subregion 25.1 of reflector element 25, no beams of rays are reflected back into semiconductor light source 24 or in the direction of its light-emitting area 24.1. In the remaining region 25.2 of the optically active surface of reflector element 25, which is facing semiconductor light source 24, reflector element 25 is arranged to be reflecting for the beams of rays emitted by semiconductor light source 24 and is for this purpose provided with a gold coating, for example.

Providing reflection-preventing subregion 25.1 on the optically active surface of reflector element 25 substantially ensures that no beams of rays are reflected back into semiconductor light source 24 and thus impair the measuring accuracy of the optical position-measuring device.

In an example embodiment, reflection-preventing subregion 25.1 of reflector element 25 takes the form of a reflection-preventing coating on the otherwise highly reflective optically active surface of reflector element 25. For example, an interferential anti-reflection coating and/or a suitable absorption coating may be used as a suitable coating. A chromium oxide coating, for example, may be considered as an absorption coating.

In the present example, as illustrated in FIG. 2b, the reflection-preventing subregion 25.1 on the curved, optically active surface of reflector element 25 has, in the projection on the lower side of carrier substrate 23, a circular cross-section and is arranged in the central region of reflector element 25. The shape and size of this subregion 25.1 required for suppressing back-reflections into semiconductor light source 24 or light-emitting area 24.1 is determined in the layout of the scanning optics using ray-tracing methods, which yield a particular minimum area on the optically active area of reflector element 25, which is then to be provided, for example, with a suitable reflection-preventing coating.

It is additionally possible, however, when using the ray-tracing method, to take into account the further boundary condition that no beams of rays are to be reflected by the reflector element back into the region surrounding light-emitting area 24.1 on the upper side of the carrier substrate, that is, enter the region occupied by the face of semiconductor light source 24 on carrier substrate 23. This makes it possible to prevent also the interfering multiple reflections between reflector element 25 and the upper side of carrier substrate 23 that were mentioned above. If this boundary condition is additionally taken into account, this results in a slightly enlarged subregion 25.1 on the optically active surface of reflector element 25, which would have to be arranged in a reflection-preventing manner.

A scanning unit according to a further example embodiment of the present invention is described below with reference to the remaining figures. In a representation analogous to FIG. 2a, FIG. 3 shows a partial representation of an example embodiment of the scanning unit, while FIGS. 4a to 4c respectively show different views of parts of another variant of the scanning unit.

The additional measures in comparison to the above-described example embodiment, which are described in more detail below, further improve the prevention of back-reflections of beams of rays by the reflector element into the semiconductor light source.

Figure 3:
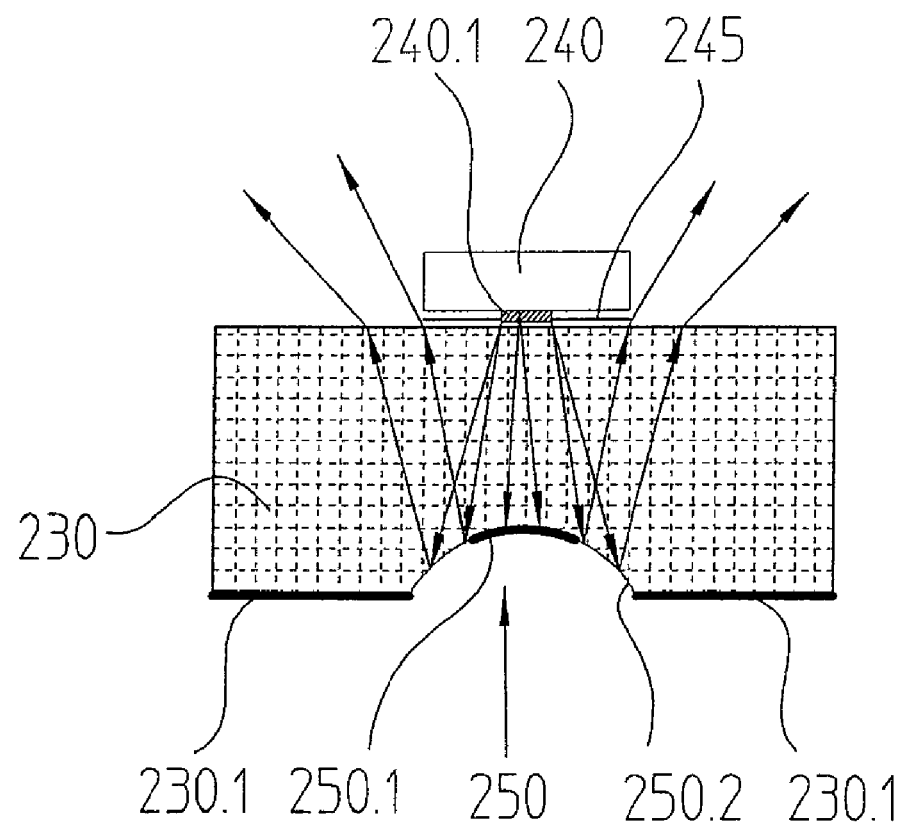
FIG. 3 is a partial view of a scanning unit according to an example embodiment of the present invention including parts of the scanning beam path.

In addition to the reflection-preventing arrangement of subregion 250.1 of reflector element 250, the exemplary embodiment illustrated in FIG. 3 also provides for the second side of carrier substrate 230 to be arranged in regions 230.1 directly adjacent to reflector element 250 so as to prevent reflections of the beams of rays emitted by semiconductor light source 240. For this purpose, an appropriate reflection-preventing subregion 230.1 may be arranged only locally around reflector element 250 or else may include the entire second side of carrier substrate 230 with the exception of reflector element 250. A reflection-preventing coating may be provided in these regions 230.1, e.g., an interferential anti-reflection coating and/or a suitable absorption coating.

Furthermore, in addition to the measures of the first-described exemplary embodiment, the exemplary embodiment illustrated in FIG. 3 provides for another reflection-preventing subregion 245 to be arranged on the first side of carrier substrate 230 around light-emitting area 240.1 of semiconductor light source 240. This may be provided in the form of a suitable reflection-preventing coating arranged in this subregion 245. This reflection-preventing subregion 245 may have at least the size of the area on carrier substrate 230 illuminated by semiconductor light source 240. An appropriate window area must be left open in the region of the of light-emitting area 240.1 of semiconductor light source 240.

Reflection-prevention subregions 230.1, 245 on the first and second side of carrier substrate 230 additionally provided in comparison to the first-described example embodiment ensure a further suppression of possible reflections from reflector element 250 back into semiconductor light source 240. In particular, they make it possible to minimize the undesired multiple reflections mentioned at the outset.

Figure 4A:
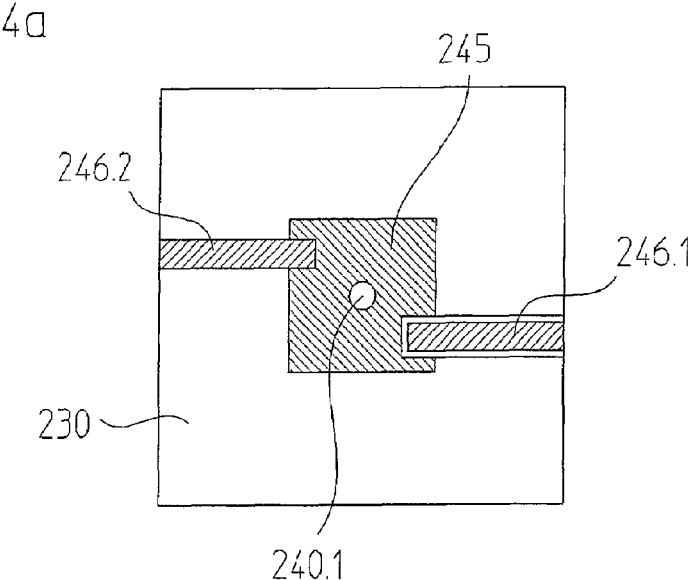
FIGS. 4a to 4c are partial views of a scanning unit according to an example embodiment of the present invention.
Figure 4B:
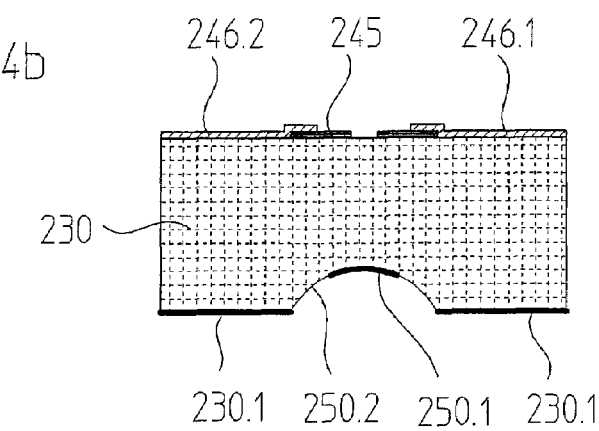
Figure 4C:
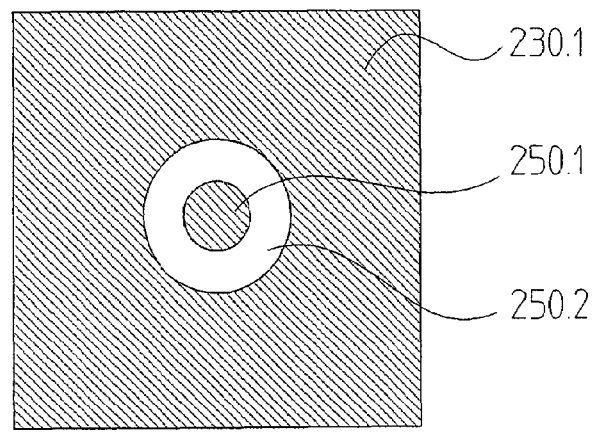

Another variant of a scanning unit is schematically illustrated FIGS. 4a to 4c. In addition to the previously explained measures with the various reflection-preventing subregions 245 on the first side of carrier substrate 230 and reflection-preventing subregion 250.1 on the optically active surface of reflector element 250, this variant provides for the reflection-preventing coating 230.1 on the second side of carrier substrate 230 to be provided over its entire area, that is, also on the optically non-active lower side of reflector element 250.

Furthermore, FIGS. 4a and 4b illustrate that electrically conductive conductor tracks 246.1, 246.2 are arranged on the first side of carrier substrate 230, which are used for electrically contacting semiconductor light source 240.

In addition to the explained exemplary embodiments there are, of course, additional possibilities for refining a scanning unit.

Thus, first it should be pointed out that scanning units for optical position-measuring devices may be provided that are based on different scanning principles than the example explained with reference to FIG. 1. Fundamentally, the relevant measures described herein may be implemented in all scanning units in which a reflector element is placed near a semiconductor light source that has a defined optical effect on the beams of rays in the scanning beam path emitted by the semiconductor light source and where reflections from the reflector element back into the semiconductor light source are to be prevented.

Furthermore, alternatively and/or in addition to providing a reflection-preventing coating on the reflector element, a suitable geometric molding of the reflector element in subregions of the same may also ensure that a reflection of beams of rays back into the semiconductor light source is prevented. For this purpose, for example, in the case of an substantially spherically curved reflector element, as explained in the above cases, a central subregion of the reflector element may have a shape, for example, that ensures that beams of rays striking it from the semiconductor light source are deflected as far as possible away from the semiconductor light source, etc.

What is claimed is:

1. A position-measuring device, comprising:
   a reflection measuring graduation including a plurality of subregions disposed along a measurement direction, the subregions having different optical reflective properties; and
   a scanning unit, the scanning unit and the reflection measuring graduation movable relative to each other along at least the measurement direction, the scanning unit including:
      a semiconductor light source; and
      at least one reflector element, downstream from the semiconductor light source, that has a defined optical effect on beams of rays emitted by the semiconductor light source;
   wherein an optically active surface of the reflector element is, in subregions, reflection-preventive and configured to prevent beams of rays from being reflected back from the reflector element into the semiconductor light source.

2. The position-measuring device according to claim 1, wherein the reflector element includes a curved optically active surface that faces the semiconductor light source, the reflector element being reflection-preventive in a central subregion and reflective in a remaining region for the beams of rays emitted by the semiconductor light source.

3. The position-measuring device according to claim 1, wherein the scanning unit includes a transparent carrier substrate, a light-emitting area of the semiconductor light source arranged on a first side of the carrier substrate, the reflector element arranged on a second side of the carrier substrate, the second side opposite the first side, the optically active surface of the reflector element oriented in a direction of the semiconductor light source.

4. The position-measuring device according to claim 3, wherein the reflector element is arranged as an optical component integrated into the second side of the carrier substrate.

5. The position-measuring device according to claim 3, wherein the second side of the carrier substrate is arranged in regions directly adjacent to the reflector element to be reflection-preventive for the beams of rays emitted by the semiconductor light source.

6. The position-measuring device according to claim 3, wherein a reflection-preventive subregion is formed on the first side of the carrier substrate around the light-emitting area of the semiconductor light source.

7. The position-measuring device according to claim 6, wherein the reflection-preventive subregion has at least a size of an area on the carrier substrate illuminated by the semiconductor light source.

8. The position-measuring device according to claim 6, wherein the reflection-preventive subregion includes a reflection-preventive coating on the carrier substrate.

9. The position-measuring device according to claim 3, wherein electrically conductive conductor tracks contacting the semiconductor light source are arranged on the first side of the carrier substrate.

10. The position-measuring device according to claim 1, wherein a reflection-preventive coating is provided in the reflection-preventive subregion of the reflector element.

11. The position-measuring device according to claim 10, wherein the reflection-preventive includes at least one of (a) an interferential anti-reflection coating and (b) an absorption coating.

12. The position-measuring device according to claim 1, wherein a side of the semiconductor light source facing the reflector element is reflection-preventive except for a light-emitting area of the semiconductor light source.

13. The position-measuring device according to claim 1, wherein the semiconductor light source includes a vertical cavity surface emitting laser.

14. The position-measuring device according to claim 1, wherein the optical position-measuring device is arranged as a rotary optical position-measuring device.

15. The position-measuring device according to claim 1, wherein the optical position-measuring device is arranged as a linear optical position-measuring device.

16. The position-measuring device according to claim 1, wherein the reflector element is arranged in a predetermined fixed position relative to the semiconductor light source.

* * * * *